United States Patent [19]
Berman et al.

[11] Patent Number: 6,134,566
[45] Date of Patent: Oct. 17, 2000

[54] METHOD FOR CONTROLLING AN ELECTRONIC MAIL PREVIEW PANE TO AVOID SYSTEM DISRUPTION

[75] Inventors: Eric Robert Berman, Redmond; Coyle Brett Marl, Seattle, both of Wash.

[73] Assignee: Microsoft Corporation, Redmond, Wash.

[21] Appl. No.: 08/884,894

[22] Filed: Jun. 30, 1997

[51] Int. Cl.[7] .................................................. G06F 15/16
[52] U.S. Cl. .......................... 707/526; 709/206; 714/38; 717/4
[58] Field of Search .......................... 707/526; 709/206; 458/402; 714/38; 717/4; 713/200, 201

[56] References Cited

U.S. PATENT DOCUMENTS

| | | | |
|---|---|---|---|
| 5,265,033 | 11/1993 | Vajk et al. | 709/206 |
| 5,278,984 | 1/1994 | Batchelor | 709/207 |
| 5,627,964 | 5/1997 | Reynolds et al. | 714/46 |
| 5,784,549 | 7/1998 | Reynolds et al. | 714/24 |
| 5,826,013 | 9/1999 | Nachenberg | 713/200 |
| 5,835,084 | 11/1998 | Bailey et al. | 345/326 |
| 5,850,559 | 12/1998 | Angelo et al. | 713/320 |
| 5,948,112 | 9/1999 | Shimada et al. | 714/16 |
| 5,956,481 | 9/1999 | Walsh et al. | 713/200 |
| 5,960,170 | 9/1999 | Chen et al. | 714/38 |
| 5,974,249 | 10/1999 | Elliot et al. | 703/27 |

OTHER PUBLICATIONS

Korns, Doug, "Improper Shutdown Notification in System 7.5," Information Alley, vol. ll, Issue 6, Jul. 10, 1995, p. 4. Available at http://www.info.apple.com/info.alley/.

Kramer, Matt, "Lotus cc:Mail Release 7 posts improvements," PCWeek Online http://www8.zdnet.com/pcweek/news/1007/07lot.html, Oct. 7, 1996, pp. 1–3. Article also appears in PCWeek Oct. 7, 1996, p. 1.

Moskowitz, David and David Kerr, et al., *OS/2 2.1 Unleashed*, Sams Publishing, Carmel, Indiana, 1993, pp. 424–425.

Simpson "Mastering WordPerfect 5.1 & 5.2 For Windows" (p. 453–454); SYBEX, 1993.

*Primary Examiner*—Stephen S. Hong
*Assistant Examiner*—Cesar B. Paula
*Attorney, Agent, or Firm*—Klarquist, Sparkman, Campbell, Leigh & Whinston, LLP

[57] ABSTRACT

A message viewing program displays a preview pane that is controlled to avoid previewing messages with disruptive message content. Before the body of a message is previewed in the preview pane, an identifier relating to the message is written to a nonvolatile storage location. After the message is previewed in the preview pane without causing a system disruption, the identifier is deleted. Before a message is previewed, the nonvolatile storage location is searched for the identifier relating to the message. If the identifier is found, the message is not previewed in the preview pane. Also, an icon is displayed indicating that the message may contain disruptive message content. Alternatively, the message viewing program writes an enable identifier to a nonvolatile storage location when it shuts down without encountering a system disruption. If the enable identifier is not present upon start up, messages are not previewed in the preview pane.

19 Claims, 8 Drawing Sheets

METHOD FOR CONTROLLING AN ELECTRONIC MAIL PREVIEW PANE TO AVOID SYSTEM DISRUPTION

FIELD OF THE INVENTION

This invention relates to previewing electronic mail messages. More particularly, the invention relates to a method for controlling an electronic mail message preview pane to prevent an electronic mail message with disruptive message content from disrupting a computer system.

BACKGROUND AND SUMMARY OF THE INVENTION

Electronic mail (hereinafter "e-mail") has become a common mode of communication among computer users. E-mail programs allow an e-mail program user (hereinafter the "author") to send an electronic mail message (hereinafter a "message") to another e-mail program user (hereinafter the "recipient") or group of users electronically over a variety of computer networks. Typically, a message includes a body and header information, such as an author-provided subject heading and the date the message was sent. A common arrangement is for each e-mail program user (who may be both an author and a recipient) to access a networked computer system running an e-mail program that allows messages to be sent, retrieved and read.

It is now common for e-mail programs to run within a graphical user interface (GUI) environment employing a windowing environment. A graphical user interface provides a graphical icon-oriented and/or menu driven environment for the user to interact with the e-mail program. The windowing environment presents the user with specially delineated areas of the screen called windows, each of which is dedicated to a particular application program, message, file, or document. Each window can act independently, as if it were a virtual display device under control of its particular application program. The windows can typically be resized, moved around the display, and stacked so as to overlay another. In some windowing environments, windows can be minimized to an icon or increased to a full-screen display. Usually, the windows have a top to bottom order in which they are displayed, with top windows at a particular location on the screen overlaying any other window at that same location. The top-most window has the "focus" and accepts the user's input. The user can switch other windows to the top by clicking with a mouse or other pointer device, or by inputting certain key combinations. This allows the user to work with multiple application programs, messages, files and documents in a similar manner as physically working with multiple paper documents and items which can be arbitrarily stacked or arranged on an actual desk.

The display area within a window is commonly divided into specially delineated areas called panes. A pane may be used to group related items or display other information. Typically, a user can select an item within one pane to control the display contents of another pane.

An e-mail program commonly presents the user with a window with at least two panes: a folder pane and a folder contents pane. Typically, the messages sent or received by the e-mail program are grouped into folders, the names of which are displayed in the folder pane. New messages are ordinarily placed by the e-mail program into a particular folder named the "in box" folder. E-mail programs commonly allow the user to create other folders, such as "pending" or "archive," into which messages may be placed. The user can select (e.g., by clicking on a folder with a pointing device such as a mouse) a folder in the folder pane. In a separate folder contents pane, the e-mail program presents a list of the messages contained in the currently selected folder. Typically, the message list is in the form of a table in which each message is identified by its header information. Message headers generally consist of attribute fields that contain identifying information of the message, such as a "from" field which contains the author's name, a "date sent" field, a "subject" field which contains an author provided subject description, and/or other fields. The header information in the folder contents information pane helps an e-mail program user find a particular message, decide whether to read the body of a message, or otherwise handle a message. For instance, a user may wish to reread an important message that was read days ago; a busy recipient who receives many new messages may wish to select which of many new messages to read; or a user may wish to place messages relating to a particular topic into a separate folder other than the in box folder.

In order to provide further information about a message to the user, some e-mail programs provide the user with a third pane called a preview pane. When the user selects a particular message in the folder contents pane, the preview pane automatically displays a portion of the message's body. In this way, the user is provided with an additional mechanism for determining how to handle the message.

To help a user handle new messages, an e-mail program typically automatically selects a message by default for display in the preview pane upon starting up or when the message is received. Typically, the default selected message is the most recently received message. In this way, new messages can be handled more efficiently by the user.

However, previewing certain messages in the preview pane may cause problems. A message that contains disruptive message content may result in a system disruption when it is previewed. For instance, a very large message may "freeze" or "crash" the computer system when the e-mail program attempts to preview it. In addition, some messages may comprise certain content processed by a message content processor when it is read or previewed. A programming error in the message content processor software may cause the system to crash when it processes certain messages. Also, there are many different ways that the message itself may contain instructions that disrupt the computer system. For example, a message may include executable instructions which tamper with the computer's operating system or access an invalid or impermissible portion of the computer system's memory. In such a case, processing the message may lead to unreliable operation or a crash of the operating system or the e-mail program. Another example is a message containing instructions that form what is commonly known as an infinite loop (i.e., a set of computer instructions that repeat without end). If a message contains such a set of statements, the message content processor software will never finish processing it. Thus, the message content processor software must be forced to terminate, leading to a computer system disruption. Also, executable instructions in a message may perform a task that consumes an excessive amount of time or system resources, effectively preventing the computer system from responding to the user.

Examples of content processed by a message content processor include audio, image, animation, or video presentations, text translated into a rendered form, instructions interpreted according to a script language, a programming object, or directly executable instructions. The message content processor can also process combinations or variations of the above, such as an encrypted message with a programming object or partially-compiled instructions.

Specifically, a message may include text to be rendered according to the HyperText Markup Language (HTML) specification, interpretable instructions according to the scripting language of Microsoft Visual Basic Script marketed by Microsoft Corporation of Redmond, Washington, a programming object (or text that is to be converted into a programming object) conforming to the ActiveX Controls specification of Microsoft Corporation, or executable machine language instructions (or text that is to be converted into executable machine language instructions). Such content is typically processed before being presented to the user, and, in some cases, processing involves executing instructions found in the message. When a message with such content is previewed in the preview pane, some or all of the message may be processed by the message content processor in order to accurately depict how the message will appear when read in the message window. Thus, certain messages with disruptive message content will lead to a system disruption when they are previewed in the preview pane.

A dilemma arises if a message with disruptive message content is received by an e-mail program that automatically previews selected messages. Typically, a message is deleted by selecting the header information in the folder contents pane relating to the message and issuing a delete command. However, if the header information relating to a message with disruptive message content is selected, the message is automatically previewed in the preview pane and a system disruption occurs. As a result, the system disruption prevents the user from issuing the delete command to delete the message. This problem is referred to herein as the undeleteability problem. Some e-mail programs offer an option to disable the preview pane, providing a way to avoid system disruptions caused by previewing messages with disruptive message content. However, the user may not recognize the pane should be disabled because the user may not know the system disruption was caused by previewing the message. Also, the user may not be familiar with the option to disable the preview pane. As a result, the user may still be effectively unable to delete the message with disruptive message content.

As discussed above, an e-mail program may automatically select and preview a newly received message. A particularly troubling dilemma can result if the newly received message contains disruptive message content. When the message is automatically selected for presentation in the preview pane, the computer system is disrupted. Thus, the user is prevented from selecting a different message or choosing any options. Each time the e-mail program is restarted, the message is again automatically selected and processed, and another system disruption occurs. Thus, the user is repeatedly prevented from avoiding the message with disruptive message content. As a result, the user cannot use the e-mail program and is prevented from reading any messages. This problem is referred to herein as the inescapable disruption problem. Some e-mail programs offer an option to read a message without interpreting its content, and, as discussed above, some e-mail programs offer an option to disable the preview pane. Neither of these options solves the inescapable disruption problem because the user cannot select the options due to the recurring system disruptions.

These two problems are further exacerbated by the fact that messages may originate from any author on the network, and the e-mail program user typically does not exercise complete control over which authors can send a message. This situation arises particularly with Internet e-mail. The Internet is a world-wide network of cooperating computer networks with millions of potential e-mail authors. If the e-mail program can receive messages from the Internet, any one of these millions of authors could intentionally send a message with disruptive message content to the user's computer system. Such a message is sometimes called a "mail bomb."

Various mechanisms exist to deal with system disruptions that occur in non e-mail programs and contexts. Some operating systems and applications software address the problem of system disruptions by running special software routines after a system disruption is detected. Such software routines attempt to stabilize the system, rebuild a faulty file system, or retrieve a backup copy of a document. For instance, when the Microsoft Windows NT operating system starts up, it determines if it was shut down properly. If the operating system was not shut down properly, it presents the user with an option to restart the operating system in a different configuration, such as one known to avoid system disruptions. In addition, some operating systems run a special routine to rebuild the file system when a system disruption is detected. Also, some word processors save a backup copy of an open document at timed intervals. Upon startup, if the word processor determines that it was not shut down properly or the document was not properly closed, the word processor presents the user with an option to retrieve the most recent backup copy of the document.

However, these attempts to avoid system disruption problems do not address the undeleteability or inescapable disruption problems that may occur in the e-mail preview context. Even if the operating system starts up with a stable configuration, the file system is rebuilt, or a backup copy of a document is retrieved, the preview pane of the e-mail program will again automatically preview a message with disruptive message content when it is selected, preventing it from being deleted. If a newly received message contains disruptive message content, it will still be automatically selected, and the system will be disrupted. Thus, effective solutions to these problems have yet to be implemented.

The invention solves these problems relating to previewing a message with disruptive message content by providing methods and apparatus for controlling the preview pane of a message reading program, such as an e-mail program.

In one embodiment, a message identifier relating to a message about to be previewed is written to a nonvolatile storage location. Upon successful preview of the message, the message identifier is deleted from the storage location. Before a particular message is previewed in the preview pane, the e-mail program checks the nonvolatile storage location for the message's message identifier. If the message identifier is present, the message possibly contains disruptive message content, and the user is presented with a warning dialog box. From the dialog box, the user can choose to not preview the message. In addition, the header information in the folder contents pane relating to any message in the nonvolatile storage location is annotated to indicate that it may contain disruptive message content.

In another embodiment of the invention, each time the e-mail program starts, it checks a nonvolatile storage location for a preview enable identifier. If the preview enable identifier is not present, the email program sets a preview enable setting accordingly, displays a warning to the user, and previews no messages. If the preview enable identifier is present, the e-mail program sets the preview enable setting accordingly, deletes the preview enable identifier from the nonvolatile storage location, and automatically previews messages. Then, during the shutdown process of the e-mail program, the preview enable setting is checked to determine whether to write the preview enable identifier to the non-volatile storage location. In this way, if a message with disruptive message content prevents the e-mail program from shutting down, no messages are previewed.

The embodiments may be used separately or combined in one e-mail program to provide two different ways of controlling the preview pane. The advantage provided by the invention is that the functionality of an automatic preview pane is available to the user, but the preview pane is controlled in such a way as to avoid previewing messages with disruptive message content. Thus, the user can continue to operate the e-mail program after receiving a message with disruptive message content. Accordingly, the user can delete the message or view it without processing its processable content. In this way, the undeleteability and inescapable disruption problems are avoided.

Additional features and advantages of the invention will be made apparent from the following detailed description of illustrated embodiments which proceeds with reference to the accompanying drawings.

DETAILED DESCRIPTION OF THE ILLUSTRATED EMBODIMENTS

The present invention is directed toward methods and systems for controlling an electronic mail preview pane to avoid computer system disruption. In the two illustrated embodiments, the invention is illustrated as implemented in a modified version of an application program entitled "Microsoft Outlook", marketed by Microsoft Corporation of Redmond, Wash. Microsoft Outlook provides a wide variety of features related to personal information management and also provides a facility for e-mail functionality, including sending, receiving, and reading messages.

Exemplary Operating Environment

Figure 1:
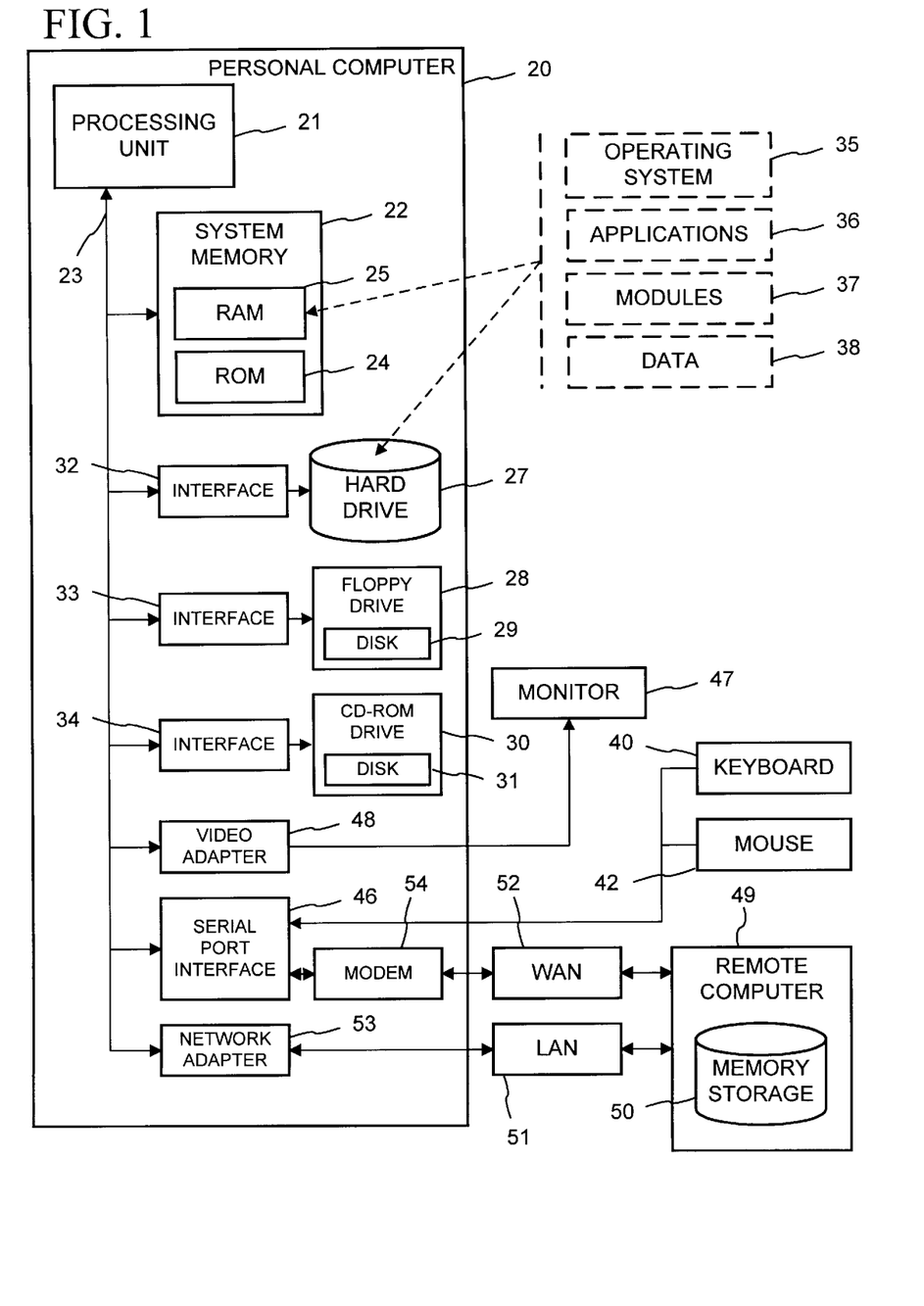
FIG. 1 is a block diagram of a computer system that may be used to implement a method and apparatus for embodying the invention.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Electronic Mail Overview

Figure 2:
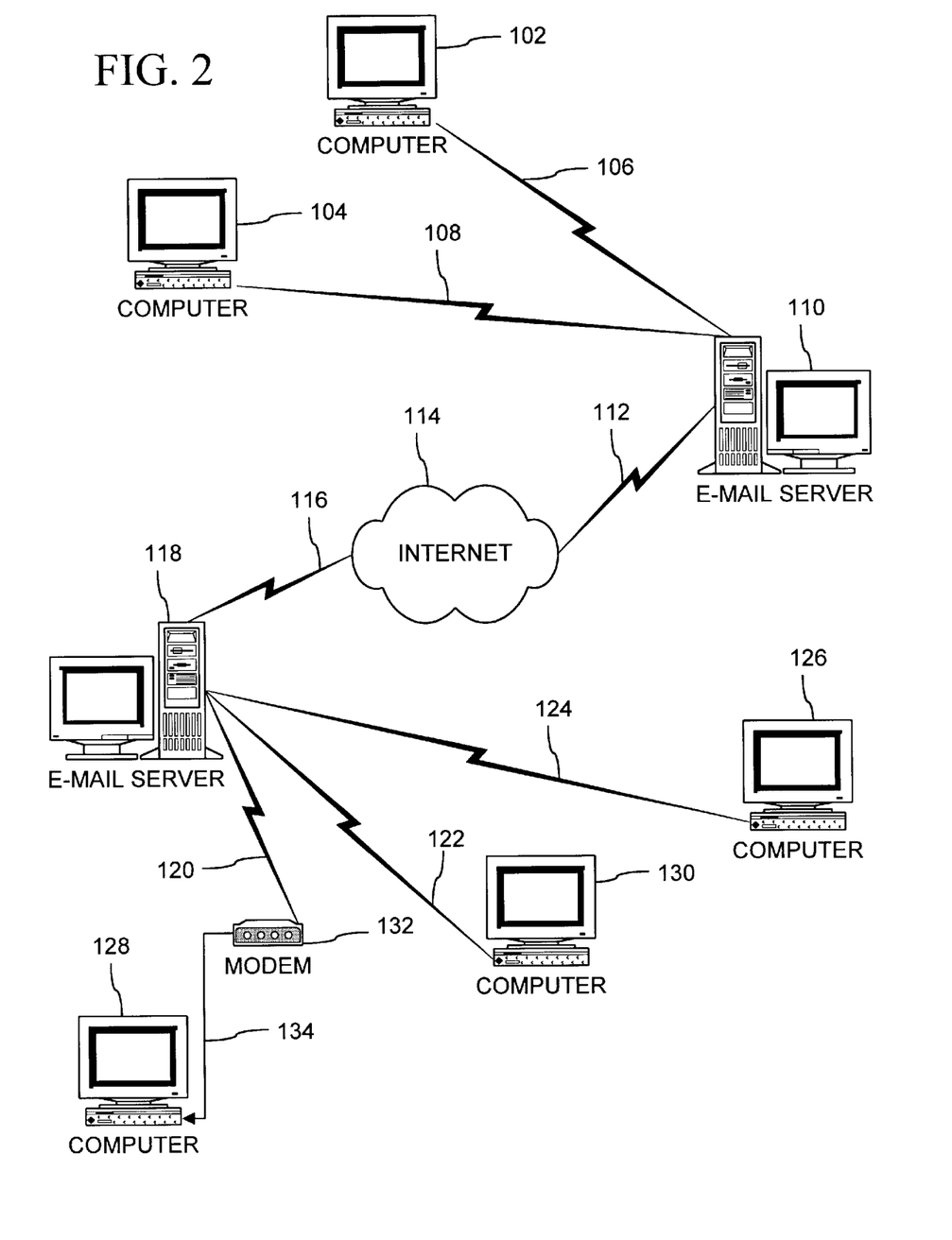
FIG. 2 is a block diagram of a network that may be used to send and receive electronic mail messages.

A network for sending and receiving electronic mail messages is illustrated at FIG. 2. The computer 102 is a computer such as the personal computer 20 (FIG. 1) and can send a message to another computer 104 by transmitting the message via the network connection 106 to the e-mail server 110. The message is then received at the computer 104 via the network connection 108. It will be appreciated that the function of the e-mail server 110 can be performed by one or both of the computers 102 and 104, thus avoiding the need for a separate e-mail server.

Optionally, the e-mail server 110 may be connected to other e-mail servers, such as the e-mail server 118, via the network connections 112 and 116 to the Internet 114, or some other network. In this way, the computer 102 can send messages to the computers 126, 128, and 130. A message from the computer 102 to the computer 128 travels though a network connection 120 to a modem 132, then through a modem connection 134 to the computer 128.

Description of the E-mail Program

Figure 3:
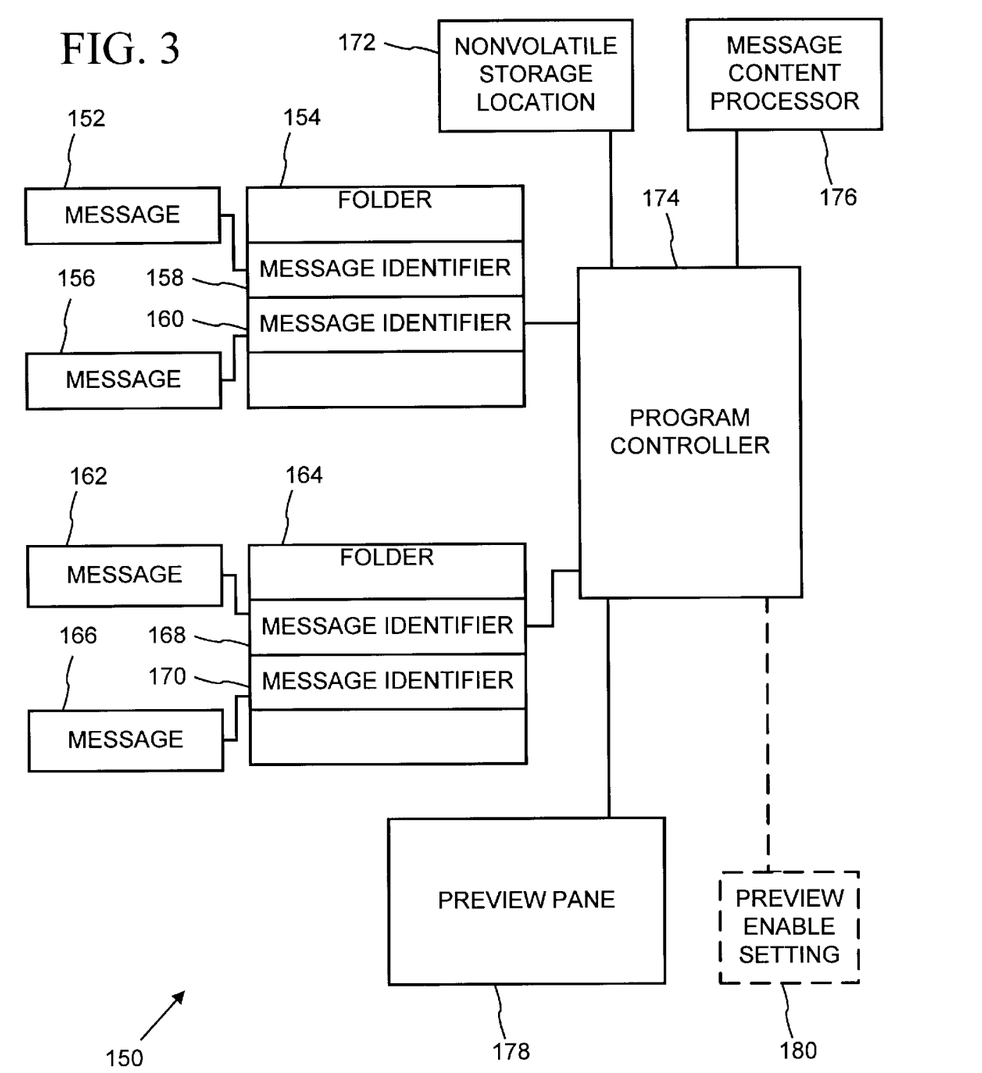
FIG. 3 is a block diagram of an electronic mail program which executes on a computer system such as shown in FIG. 1.

An e-mail program 150 is illustrated at FIG. 3. The program controller 174 controls the e-mail program 150. The selected message 152 is related to the selected folder 154 and is identified uniquely within the e-mail program 150 by the message identifier 158. The message identifier 158 is not normally shown but is stored internally as two double words (i.e., two sets of binary bits) by the e-mail program 150. One double word identifies the folder 154 in which the message 152 resides. Each time a message is added to a folder 154 or 164, a message identifier count is incremented by one for that folder 154 or 164. The other double word is derived from the message identifier count. In this way, the message identifier 154 is unique within the e-mail program 150. The message identifier 154 may take many other forms, such as those used by Internet mail messages, which are generated by an e-mail program or an e-mail server when a message is sent (e.g., "<BOE879402932CF11B92700805 F14E35C04AB3358@REG-71-NSG.dns.company.com>"). Preferably, the message identifier 154 is stored in a registry, a central store of information relating to the operating system 35 (FIG. 1), but could be stored in another location.

The message 156 is identified by the message identifier 160 and is related to the selected folder 154. The messages 162 and 166 are identified by the message identifiers 168 and 170, respectively, and are both related to the folder 164.

The nonvolatile storage location 172 is used by the e-mail program 150 when performing the methods described below to hold various information related to the methods. The nonvolatile storage location 172 is preferably located on the hard drive 27 of the personal computer 20 (FIG. 1). However, it will be appreciated that the nonvolatile storage location 172 could be any storage location which retains its contents after a system disruption, such as a flash memory card.

The message content processor 176 may be used to process the processable content of the messages 152, 156, 162, and 166. The message content processor 176 or portions of it may reside as part of the e-mail program 150, or be other software accessible to the e-mail program 150. The message content processor 176 can process messages containing HyperText Markup Language (HTML) and may process other formats, such as digital audio presentations, scripting languages and programming objects, all of which are described in more detail below.

The preview pane 178 is used for previewing the selected message 152. The preview pane 178 displays whatever initial portion of the message 152 will fit within the display dimensions of the preview pane 178 (which may be the entire message 152), including items processed by the message content processor 176. Under certain conditions, the preview pane 178 is not used, as described in the methods below. The preview enable setting 180 is a storage location used to store a boolean value used to determine whether or not the preview pane 178 is used to preview any message. The preview enable setting 180 is not required for the method of controlling the preview pane 178 relating to monitoring the preview of a particular message.

Figure 4:
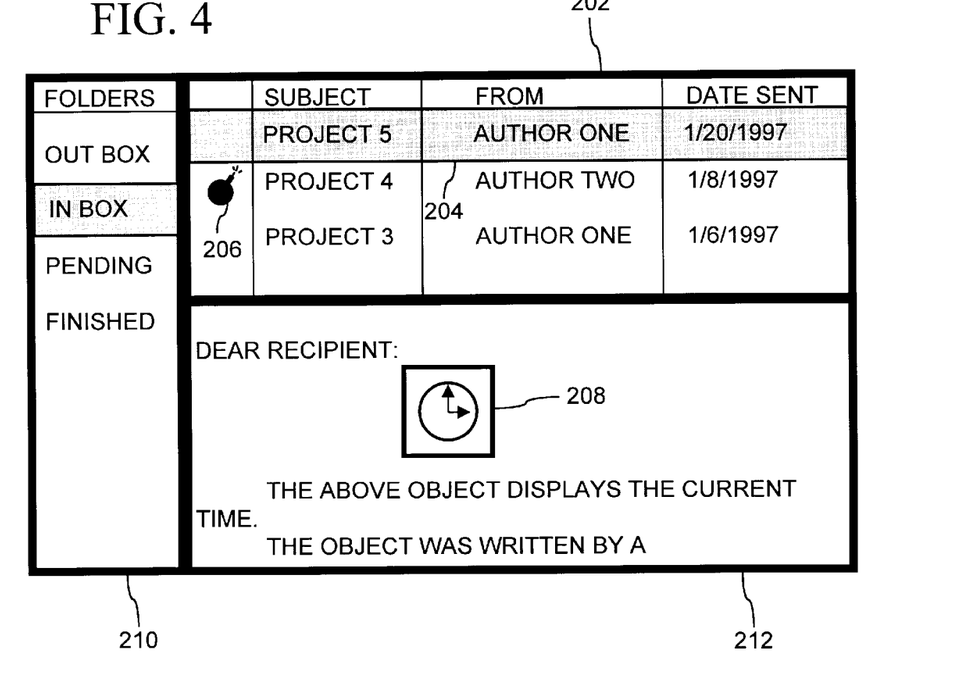
FIG. 4 is a view of a user interface presented by the electronic mail program of FIG. 3.

The user interface of e-mail program 150 is illustrated at FIG. 4. The folder list pane 210 lists the names of folders in which messages are stored. Header information relating to messages in the selected folder "IN BOX" is listed in the folder contents pane 202. According to the invention, a special icon 206 is displayed if it is determined that a message may contain disruptive message content. A preview of the body of the message relating to the currently-selected header information 204 is displayed in the preview pane 212, including the preview 208 of a processed item.

Figure 5:
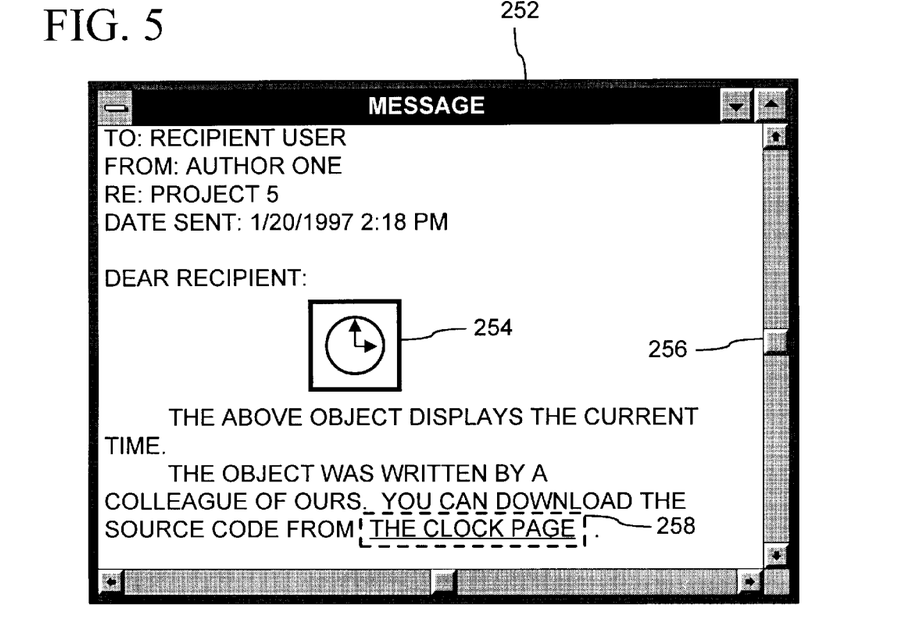
FIG. 5 is a view of an electronic mail message window presented by the electronic mail program of FIG. 3.

When the user indicates that the message relating to the header information 204 is to be read (e.g., by double clicking with a pointing device such as a mouse on the summary information 204 or selecting "Read" from a menu bar), header information and the entire body of the message, including the processed item 254 and the hyperlink 258, are displayed in the message window 252 shown at FIG. 5. If the header and entire message do not fit within the display dimensions of the window 252, the user may use a variety of controls to scroll through the message window 252, such as the scroll box 256.

Processable Content Overview

The message content processor 176 (FIG. 3) can process a variety of formats that may appear in the content of a message 152. Examples of processable content include digital representations of audio, image, animation, or video presentations. Digital formats for representing such presentations are well known in the art and include such formats at "wav," "gif," and "avi." Preferably, these formats are interpreted by software separate from the e-mail program 150, but appear to the user to be processed by the e-mail program 150.

Another example of processable content is hypertext, such as content following the HyperText Markup Language (HTML) specification. HTML is commonly used on the Internet and is typically viewed using an HTML viewer (also known as a "web browser"). However, HTML can also be used on computer systems not using the Internet and may be viewed inside programs other than a web browser, such as the e-mail program 150 or a word processor. Preferably, HTML appears to be processed by the e-mail program 150 but is actually processed by software separate from the e-mail program 150. This separate software is sometimes called an "HTML engine".

HTML uses a special set of characters ("<" and ">") called tag delimiters to denote an HTML tag. The first word in an HTML tag is the HTML tag name. Within each tag may be attributes that further describe the tag. A simple tag, such as "<B>" denotes bold text. A more sophisticated tag, such as <A HREF="test.htm"> indicates a reference to another document using the attribute keyword HREF with an attribute value of "test.htm." Such a reference to another document is also known as a hyperlink. Hyperlinks connect documents, and a certain set of connected documents available on the Internet are collectively known as the World Wide Web. A hyperlink may also appear in an electronic mail message 152, allowing a user to navigate to a specific document on the World Wide Web portion of the Internet, another network, or the recipient's computer system. It will be appreciated that there are a wide variety of tags available in HTML and related extensions and enhancements to the HTML specification. For a detailed discussion of HTML, see *HTML 3: Electronic Publishing on the World Wide Web* by Dave Raggett et al., Addison-Wesley Longman Ltd., Essex, England, 1996.

Another related type of processable content is an instruction meant to be interpreted (i.e., converted into executable machine code) according to a scripting language. Such instructions may be included in the content of a message according to the HTML specification described above or some other means. Commonly used scripting languages are Visual Basic Script of Microsoft Corporation and JavaScript of Netscape Corporation of Mountain View, Calif.

For example, the following text incorporates a Visual Basic Script as part of the HTML specification by using a special "SCRIPT" tag:

<SCRIPT LANGUAGE=VBScript>
      document.bgColor="White"
      document.write "<HR>"
      document.write
        "This is an example script."
      document.write "<HR>"
    </SCRIPT>

The above example is processed by the message content processor 176, which interprets the script for execution according to the scripting language. Preferably, the e-mail program 150 executes a scripting engine separate from the e-mail program 150 to process the script. The scripting engine interprets the script and executes the appropriate instructions. The above example causes execution of instructions that set the background color to white, display a horizontal rule (HR), display the sentence, "This is an example script.," and display another horizontal rule. Scripting languages include a wide variety of commands, including program flow control commands that can be used to construct an infinite loop. There are currently many various scripting and related languages (such as macro languages) in existence, and new ones are likely to be developed.

Another form of processable content is a programming object. A programming object may comprise methods which contain executable computer code. An example of one such programming object is a programming object conforming to the ActiveX Controls specification of Microsoft Corporation, called an ActiveX control. An ActiveX control can be represented in such a way that it can be included in the body of an electronic mail message 152 by using a special "OBJECT" HTML tag. For a detailed discussion of ActiveX, see *Understanding ActiveX and OLE* by David Chappell, Microsoft Press, Redmond, Wash. 1996.

Another form of programming object is denoted by a special HTML tag with the name of "applet." Such a tag includes a "code" attribute keyword which relates to a file containing the compiled version of an applet according to the Java language specification of Sun Microsystems, for example, <applet code="test.class" width=100 height=50>. A Java applet is a programming object written in the Java object oriented programming language commonly used on the World Wide Web and may contain executable instructions. According to the Java specification, Java applets must follow a certain security protocol aimed at preventing computer system disruption. For a detailed discussion of Java, see *Hooked on Java: Creating Hot Web Sites with Java Applets* by Arthur van Hoff et al, Addison-Wesley Publishing Company, Reading, Mass., 1996.

Programming objects according to specifications other than the ActiveX Controls specification or Java may be present in a message 152. Many possible ways of including a programming object in a message 152 exist, and new ones will likely be developed.

Many other types of processable content can be included in a message 152. For example, a message can be determined to comprise a document composed with a document editor such as a word processor. Such documents commonly allow the inclusion of macros, or instructions written in a specialized macro language according to the document editor's specifications. These macros may execute (or be interpreted) when the message 152 is processed for viewing as a document by the message content processor 176.

As a result of these various ways of including various items in a message 152, the message 152 may contain executable instructions that perform various functions, such as writing files, opening windows, or performing other functions according to the executable instructions associated with the content.

Figure 6:
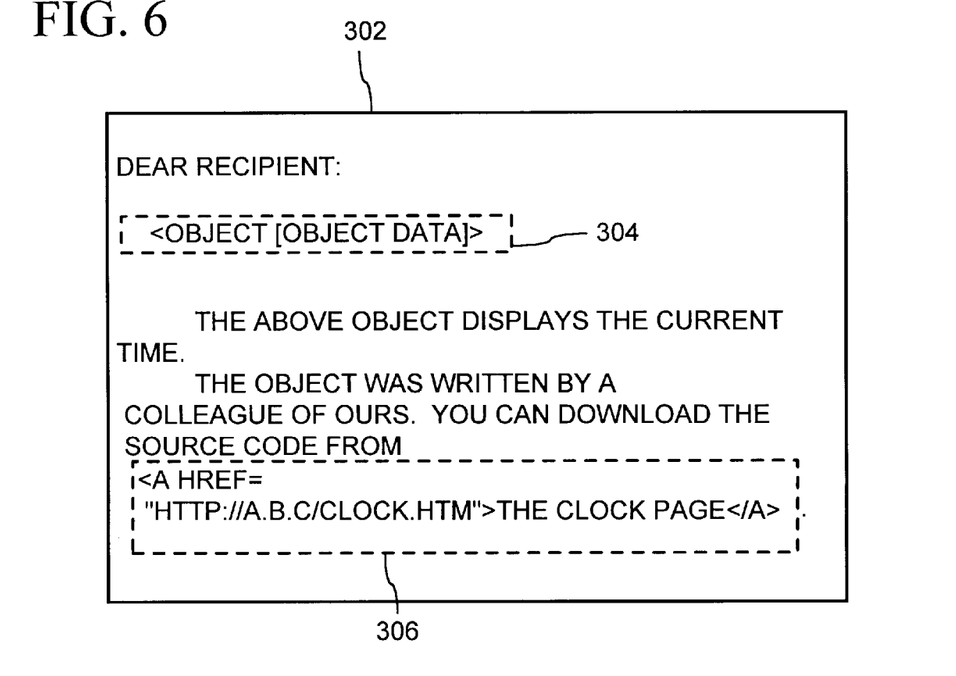
FIG. 6 is a diagram showing an unprocessed portion of an electronic mail message sent or received by the electronic mail program of FIG. 3.

An example of processable content is illustrated in FIG. 6. A portion 302 of the message 152 is shown in its unprocessed form. When processed, the message 152 appears as shown in the message window 252 (FIG. 5). The unprocessed information 304 is shown as the processed item 254 when processed. The unprocessed information 304 may contain a variety of information, including executable instructions. The unprocessed information 306 appears as a hyperlink 258 when processed. When a user selects (e.g., uses a pointer device such as a mouse to click on) the hyperlink 258, the user is presented with the document relating to the hyperlink 258 (i.e., "http://a.b.c/clock.htm"). Many other types of processable information may appear in a message 152 and be displayed in the message window 252 in a variety of ways.

Overview of System Disruption

There are many different ways a computer system such as a personal computer 20 (FIG. 1) can be disrupted as a result of previewing the body of a message 152. A computer system disruption may result in abnormal operation in the e-mail program 150, the message content processor 176, the operating system 35, or some other system of personal computer 20, preventing the user from viewing messages. Such a disruption is sometimes called "crashing" or "freezing" a program or system. For instance, personal computer 20 could be disrupted when some resource limit of the message content processor 176 (or the operating system 35) is exceeded when attempting to preview the body message 152. This could result from the exceedingly large size of the message 152 or the exceedingly large size of a processable item in the message 152, such as a large digitized sound presentation.

The personal computer 20 could also be disrupted when the processing unit 21 encounters an invalid instruction or an attempt is made to access some invalid or impermissible portion of the system memory 22. For example, the developers of the software in the message content processor 176 may have failed to account for a particular situation that arises when processing the message 152. As a result, the message content processor 176 may attempt to access some invalid or impermissible portion of the system memory 22 when processing the message 152. Alternatively, a programming error may lead to erroneous logic in the program known as a "bug" or an infinite loop that must be interrupted. In these cases, the operation of the message content processor 176 may lead to a system disruption.

Alternatively, a message 152 may contain executable content which results in disruption. For example, the message 152 may include a script or executable instructions that tamper with the operating system 35, leading to unpredictable operation or a crash. Or, the message 152 may contain erroneous logic.

Yet another form of system disruption is called a "denial of service." A denial of service disruption results in execution of instructions which perform (or attempt to perform) a task that consumes an inordinate (or infinite) amount of time or resources, such as opening a thousand windows or sending a thousand messages to a thousand different recipients. A denial of service disruption may lead the user to interrupt the computer system to avoid completion of the task or to stop a task that repeats without end. Interruption may include forced termination of the e-mail program or resetting personal computer 20, either of which may result in a system disruption. A denial of service may originate from a message 152 or the message content processor 176.

The various forms of disruption may be the result of unintentional events. However, they may also be the result of actions by a malicious author. For instance, the developers of the software of the message content processor 176 may have unintentionally included erroneous logic in the message content processor 176. A malicious e-mail author who knows of the erroneous logic in the message content processor 176 could intentionally send a message 152 containing content causing the erroneous logic to be invoked. In this way, the malicious author uses the erroneous logic (which was produced unintentionally) to achieve intentional disruption of the recipient's personal computer 20. Alternatively, a malicious author may write executable instructions that tamper with the operating system 35, execute an infinite loop, or result in a denial of service. Since users of the e-mail program 150 typically do not completely control from whom they can receive messages, the user is subject to receiving a message 152 containing disruptive message content sent by a malicious user.

Although certain programming languages include specifications to prevent system disruption, a personal computer 20 cannot distinguish between instructions that execute a desirable task (perhaps one that takes several hours to complete) and a malicious denial of service. Therefore, programming language specifications cannot effectively guarantee that programs originating from a malicious user not be received, processed, or executed.

Controlling the Preview Pane By Monitoring the Preview of a Particular Message In a first embodiment of the invention, the preview pane 178 is controlled by monitoring the preview of a particular message. With reference to FIG. 3, an e-mail program 150 stores the messages 152, 156, 162, and 166 related to folders 154 and 164. Any of the messages 152, 156, 162, or 166 are automatically previewed in the preview pane 15 178 when the message 152, 156, 162, or 166 is selected. Preferably, a message 152, 156, 162, or 166 is selected when header information relating to the message is selected in the folder contents pane 202 (FIG. 4). However, messages could be selected in some other way, such as from a menu or some other list. Finally, the e-mail program 150 automatically selects the most recently received message for automatic preview.

Figure 8:
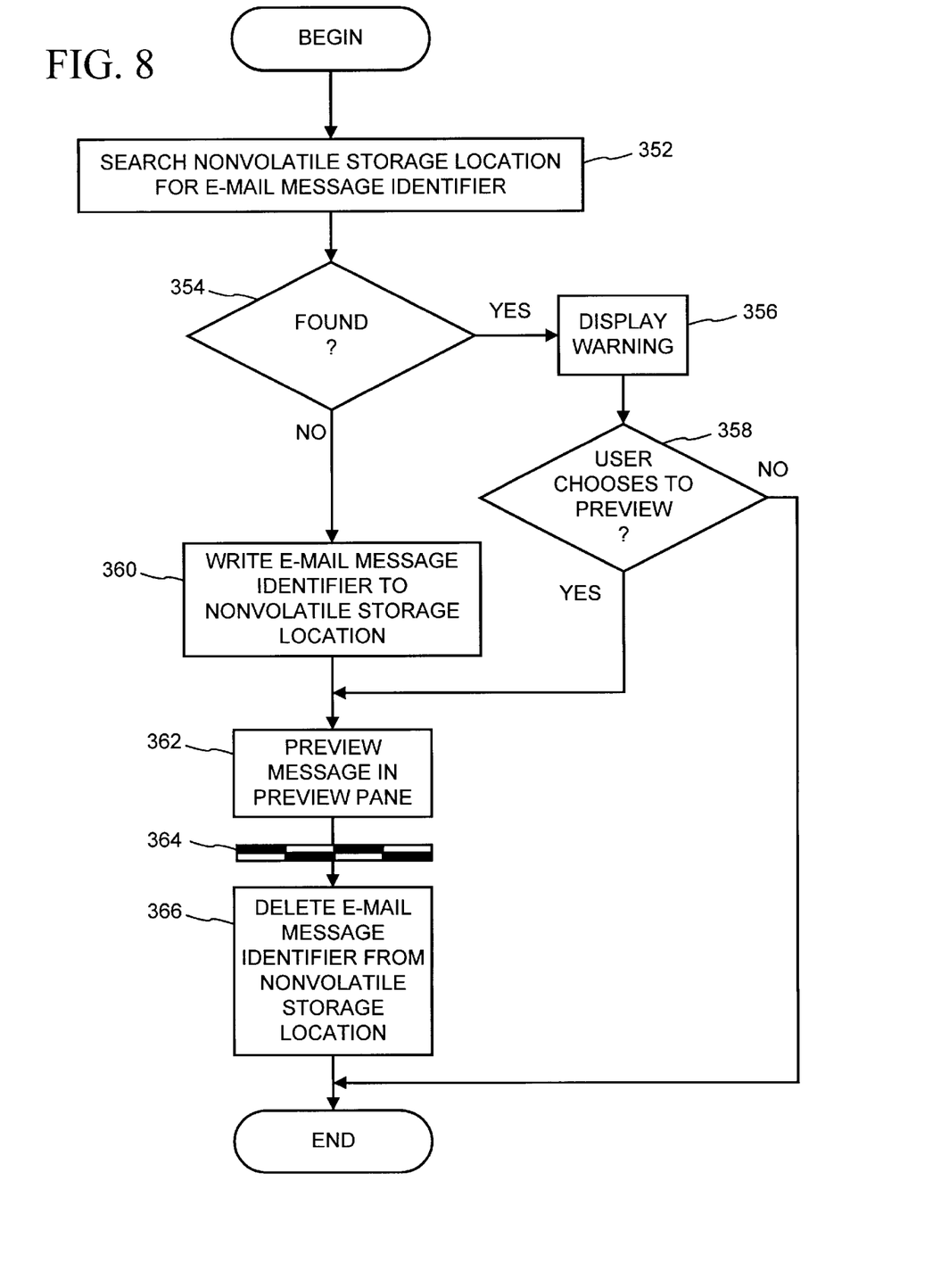
FIG. 8 is a flow chart of a method performed by the electronic mail program of FIG. 3 for controlling a preview pane by monitoring the preview of a particular message.

A method for controlling the automatic preview of a selected message 152, 156, 162, or 166 in the preview pane 178 by monitoring the preview of the message 152, 156, 162, or 166 associated with the message identifier 158, 160, 168, or 170 is illustrated with reference to FIG. 3 and FIG. 8. The method is performed whenever a message 152, 156, 162, or 166 is selected for automatic preview in the preview pane 178. For purposes of illustrating the method, the e-mail message 152 is selected for automatic display in the preview pane 178.

At step 352, the method searches the nonvolatile storage location 172 for the message identifier 158 relating to the message 152. At step 354, it is determined if the message identifier 158 is found. If so, a warning is displayed at 356, and the user is given the option to not preview the message 152. At step 358, if it is determined that the user has chosen to not preview the message 152, the method ends. If it is determined that the user has chosen to preview the message 152, the method continues at step 362, described below. If the message identifier 158 is not found, at step 360, the message identifier 158 is written to the nonvolatile storage location 172.

At step 362, the message 152 is previewed in the preview pane 178. If there is any processable content in the message 152 to be displayed in the preview pane 178, it is processed by the message content processor 176 for display in the preview pane 178.

During or after step 362, a system disruption 364 for whatever reason related to step 362 may occur. Such a system disruption 364 prevents step 366 from being performed. If a system disruption 364 does not occur, the method continues at step 366. At step 366, the message identifier 158 is deleted from the nonvolatile storage location 172, and the method ends.

When displaying the summary information of a message relating to a message identifier located in the nonvolatile storage location 172, a special icon 206 (FIG. 4) is used to indicate that a message 152 may contain disruptive message content. The icon is included in the folder contents pane 202 when the folder contents pane 202 is generated by the e-mail program 150. The method of generating the header information in the folder contents pane 202 relating to messages in a folder 154 is well known in the art. An additional step displays an icon 206 if the message identifier of a particular message is present in the nonvolatile storage location 172.

An advantage of the method is that it ordinarily allows the messages 152, 156, 162, and 166 to be automatically previewed in the preview pane 178, but it avoids the undeleteability and inescapable disruption problems described above by controlling the automatic preview of messages in the preview pane 178.

Example of Controlling the Preview Pane By Monitoring the Preview of a Particular Message For purposes of the following example, previewing the message 152 leads to a computer system disruption for any of the reasons discussed above. Also, for purposes of the example, the message 152 is the most recently received message, so it is automatically selected and previewed by the e-mail program 150.

When the e-mail program 150 is run, the message 152 is automatically selected, and is to be shown in the preview pane 178. Accordingly, the method illustrated at FIG. 8 begins at step 352. At step 352, the nonvolatile storage location 172 is searched for the message identifier 158. At step 354, the message identifier 158 is not found. Accordingly, execution proceeds to step 360, where the message identifier 158 is written to the nonvolatile storage location 172. At 362, a preview of the message 152 in the preview pane 178 is attempted, but attempting to preview the message 152 causes a computer system disruption 364 (e.g., the e-mail program 150 crashes). Therefore, the remaining steps of the method are not executed.

Figure 7:
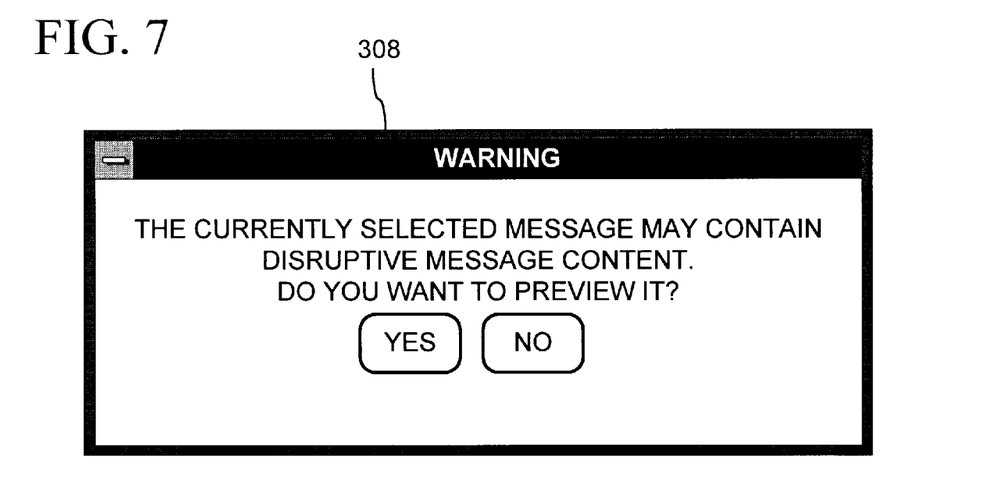
FIG. 7 is a view of a warning dialog box presented by the electronic mail program of FIG. 3.

The next time the e-mail program 150 is run, the message 152 is again automatically selected, and is to be shown in the preview pane 178. Accordingly, the method illustrated at FIG. 8 begins at step 352. At step 352, the nonvolatile storage location 172 is searched for the message identifier 158. At step 354, the message identifier 158 is found. Accordingly, execution proceeds to step 356, where a warning dialog box 308 (FIG. 7) is displayed to the user. At step 358, it is determined that the user chooses to not preview the message 152, and the method ends without previewing the message 152 in the preview pane 178. At this time, the user can access the functions of the e-mail program 150 and delete the message 152 identified by the message identifier 158. In this way, the disruptive message content of the message 152 is avoided. Preferably, when the message 152 is deleted, the message identifier 158 is deleted from the nonvolatile storage location 172 to avoid accumulation of message identifiers relating to deleted messages.

Controlling the Preview Pane By Monitoring the Shutdown of the E-mail Program

In a second embodiment of the invention, the preview pane 178 is controlled by monitoring the shut down of the e-mail program 150. This second embodiment can be used by the e-mail program 150 separately or in conjunction with the first embodiment described above to provide two different ways of controlling the preview pane 178. With reference to FIG. 3, an e-mail program 150 has the messages 152, 156, 162, and 166 grouped into folders 154 and 164. Any of the messages 152, 156, 162, or 166 are automatically previewed in preview pane 178 when the message 152, 156, 162, or 166 is selected. Preferably, a message 152, 156, 162, or 166 is selected when header information relating to the message is selected in the folder contents pane 202 (FIG. 4). However, messages could be selected in some other way, such as from a menu or some other list. Finally, the e-mail program 150 automatically selects the most recently received message for automatic preview.

Figure 9:
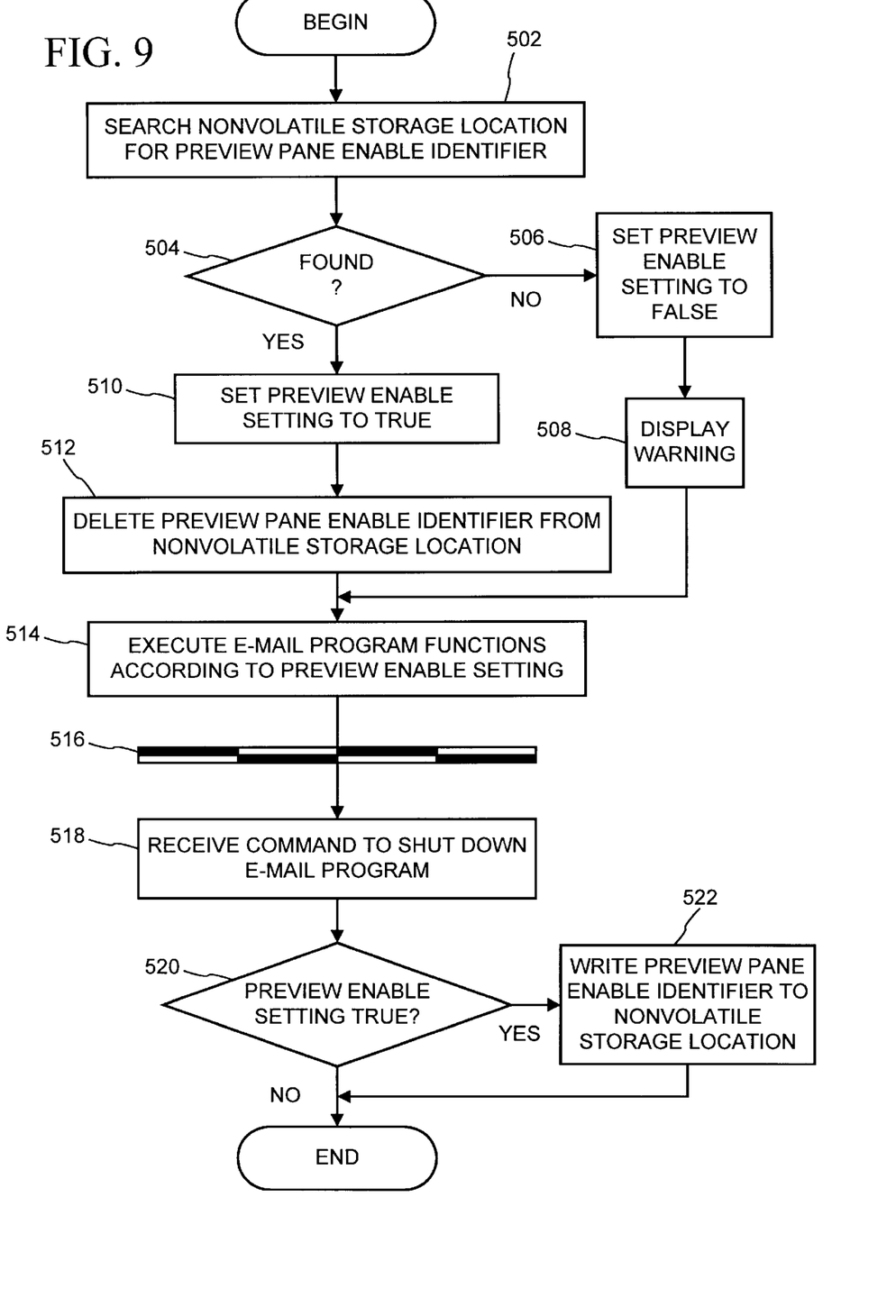
FIG. 9 is a flow chart of a method performed by the electronic mail program of FIG. 3 for controlling a preview pane by monitoring the shutdown of the electronic mail program.

A method for controlling the automatic preview of any message 152, 156, 162, or 166 in preview pane 178 by monitoring the shut down of e-mail program 150 is illustrated with reference to FIG. 3 and FIG. 9. The method is performed whenever the e-mail program 150 starts.

At step 502, the method searches the nonvolatile storage location 172 for a preview pane enable identifier. The preview pane enable identifier is a string of characters (e.g., "PreviewPaneOn") indicating that the preview pane 178 is enabled. Preferably, during the installation of the e-mail program 150 on the personal computer 20, the preview pane enable identifier is written to the nonvolatile storage location 172.

At step 504, it is determined whether the preview pane enable identifier is found. If not, at step 506, the preview enable setting 180 is set to FALSE, and a warning is displayed at 508. If the preview pane enable identifier is found, at step 510, the preview enable setting 180 is set to TRUE, and at step 512, the preview pane enable identifier is deleted from the nonvolatile storage location 172.

At step 514, the e-mail program 150 executes its functions according to the preview enable setting 180. If the preview enable setting 180 is TRUE, messages are previewed in the preview pane 178. If the preview enable setting 180 is FALSE, no messages are previewed in the preview pane 178. Preferably, the e-mail program 150 offers the user an option to manually toggle (i.e., set to TRUE or FALSE) the preview enable setting 180.

During or after step 514, a system disruption 516 for whatever reason related to step 514 may occur. Such a system disruption 516 prevents the performance of remaining steps 518, 520, and 522. If a system disruption 516 does not occur, the method continues at step 518.

At step 518, a command to shut down the e-mail program 150 is received. This command can be received by the e-mail program 150 directly, from another program, or from the operating system 35 (FIG. 1). After receiving the command to shut down, the preview pane enable setting 180 is checked at step 520. If the preview pane enable setting 180 is TRUE, the preview pane enable identifier is written to the nonvolatile storage location 172 at step 522, and the method ends. If the preview pane enable 180 is FALSE, the method ends.

Disruption could still be avoided if step 522 were performed without checking the preview enable setting 180 at step 520. However, execution of step 520 prevents the preview pane 178 from being enabled upon a subsequent startup if the preview enable setting 180 was set to FALSE manually by the user or in some other way.

Instead of using the described preview pane identifier, alternate ways of indicating proper or improper termination of the e-mail program 150 are possible. For example, an attribute/value pair (e.g., "autopreview=off") could be stored in the nonvolatile storage location 172. Two identifiers could be used, a preview enable identifier indicating proper shutdown and a preview disable identifier (e.g., "PreviewPaneOff" or "pane=off") indicating improper shutdown. Also, an indicator (e.g., a single bit or byte) in a particular location of a configuration file in the nonvolatile storage location 172 could be assigned a value to indicate successful termination.

Also, a preview preference identifier indicating the user's preference concerning the preview pane (i.e., whether or not the e-mail program user prefers message previewing) could be used. The preview preference identifier is used in conjunction with the preview enable identifier. Accordingly, in addition to storing the preview enable setting 180 (FIG. 3), the message reader stores a preview preference setting. The preview preference setting can be changed by the user (e.g., by selecting an option from the menu bar with a pointing device such as a mouse), and a preview enable identifier indicating the user's preference is written to the nonvolatile storage location when the message reader shuts down. The two settings are preferably boolean values, and the logic of the method is modified accordingly. For instance, if the preview preference setting indicates that the user prefers that messages not be previewed, the preview enable setting need not be considered.

An advantage of the method is that messages 152, 156, 162, and 166 can be previewed in the preview pane 178 under ordinary circumstances. However, when the nonvolatile storage location 172 indicates that the e-mail program 150 has not shut down properly, the preview pane 178 does not automatically preview the messages 152, 156, 162, or 166 if selected. Thus, the second embodiment of the invention avoids the undeleteability and inescapable disruption problems described above.

Example of Controlling the Preview Pane By Monitoring the Shutdown of the E-mail Program For purposes of the following example, previewing the message 152 in the preview pane 178 leads to a computer system disruption for any of the reasons discussed above. Also, for purposes of the example, the message 152 is the most recently received message, so it is automatically selected and previewed by the e-mail program 150. Finally, for purposes of the example, the preview pane enable identifier is initially present in the nonvolatile storage location 172.

When the e-mail program 150 starts up, at step 502, the nonvolatile storage location 172 is searched for the preview pane enable identifier. At step 504, the preview pane enable identifier is found. Accordingly, execution proceeds to step 510, where the preview enable setting 180 is set to TRUE. At step 512, the preview pane enable identifier is deleted from nonvolatile storage location 172. At step 514, the e-mail program 150 executes its functions according to the preview enable setting 180, which is TRUE.

Since the message 152 is automatically selected, an attempt is made to preview it in the preview pane 178, and a system disruption 516 occurs. Thus, the remaining steps of the method are not performed. A similar result would be reached if the message 152 were selected by the user instead of automatically selected.

Figure 10:
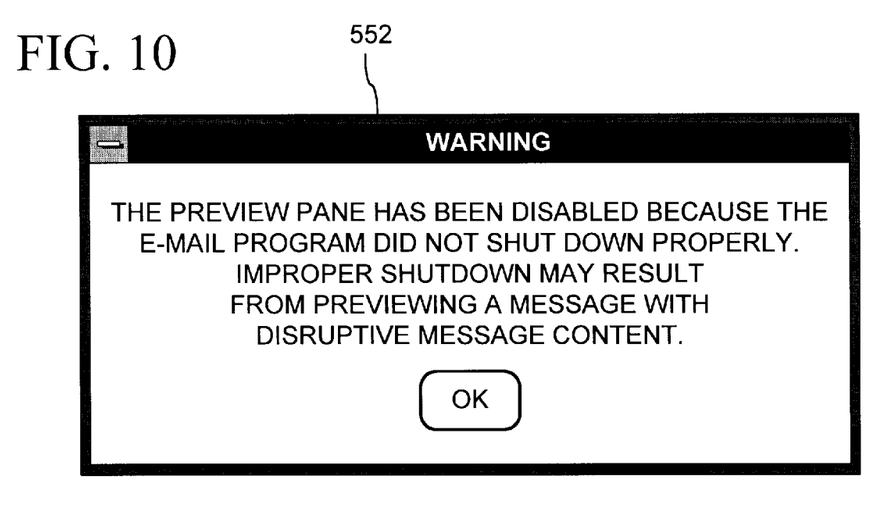
FIG. 10 is a view of a warning dialog box presented by the electronic mail program of FIG. 3.

The next time the e-mail program 150 starts up, at step 502, the nonvolatile storage location 172 is searched for the preview pane enable identifier. At step 504, the preview pane enable identifier is not found. Accordingly, execution proceeds to step 506, where the preview enable setting 180 is set to FALSE. Next, at step 508, a warning dialog box 552 (FIG. 10) is displayed to the user. At step 514, the e-mail program 150 executes its functions according to the preview enable setting 180, which is FALSE.

Although the message 152 is automatically selected, it is not previewed in the preview pane 178 because the preview enable setting 180 is FALSE. Thus, no system disruption 516 occurs, and the user has access to the normal functions of the e-mail program 150. The user can then delete the message 152 and later set the preview enable setting 180 to TRUE. In this way, the disruptive message content of the message 152 is avoided but another message 156, 162, or 166 can still be previewed. Subsequently, the e-mail program 150 receives a command to shut down at step 518. At step 520, it is determined that the preview enable setting is TRUE. Therefore, execution proceeds to step 522, where the preview pane enable identifier is written to the nonvolatile storage location 172, and the method ends.

Although the two above embodiments pertain to an e-mail program, the systems and methods could be applied to avoid a non e-mail message with disruptive message content in systems for reading news (e.g., the worldwide Usenet message system) or any other non e-mail messaging systems.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer connected to a network comprising a remote computer and having a user interface for previewing a set of messages received over the network from the remote computer via a messaging system, wherein a message out of the set of messages received over the network from the remote computer via the messaging system comprises disruptive content and attempting previewing the message comprising disruptive content leads to a disruption, a method for controlling message previewing in a preview pane to avoid attempting previewing the message having disruptive content, the method comprising:

selecting a message received over the network from the remote computer via the messaging system for previewing in a preview pane, wherein said previewing leads to a disruption when attempting previewing the message having disruptive content;

checking a nonvolatile storage location for an identifier indicative of attempting previewing of a message received over the network from the remote computer via the messaging system, wherein said attempting previewing led to a disruption related to message previewing;

omitting to preview the selected message received over the network from the remote computer via the messaging system responsive to determining the identifier indicates attempting previewing of a message received over the network from the remote computer via the messaging system, wherein said attempting previewing led to a disruption related to message previewing; and performing the following steps if the identifier indicating having attempting previewing of a message received over the network from the remote computer via the messaging system, wherein said attempting previewing led to a disruption related to message previewing is not present:

(a) writing an identifier indicative of attempting previewing of a disruptive message received over the network from the remote computer via the messaging system, wherein said attempting previewing led to a disruption related to message previewing to the nonvolatile storage location;

(b) attempting to preview a body of the selected message received over the network from the remote computer via the messaging system in the preview pane; and (c) removing the identifier indicative of attempting previewing of a disruptive message received over the network from the remote computer via the messaging system, wherein said attempting led to a disruption related to message previewing from the nonvolatile storage location responsive to determining no disruption related to message previewing occurred.

2. The method of claim 1, wherein the identifier is a message identifier relating to a message received over the network from the remote computer via the messaging system, the message received over the network from the remote computer via the messaging system comprising disruptive message content.

3. A computer-readable medium having computer-executable instructions for performing the steps recited in claim 1.

4. The method of claim 1 wherein the identifier is a message identifier relating to an electronic mail message, the electronic mail message comprising disruptive message content.

5. The method of claim 4, wherein the preview pane is part of a message reading program, the message reading program comprising a folder contents pane operative for displaying header information regarding a message received over the network from the remote computer via the messaging system, the method further comprising:

displaying an icon indicative of disruption in the folder contents pane if a message identifier is present in the nonvolatile storage location.

6. The method of claim 5 wherein the icon is displayed proximate to the header information relating to the message associated with the message identifier present in the nonvolatile storage location.

7. The method of claim 1, wherein the preview pane is controlled by a software program and the identifier is indicative of a disruption before the software program was shut down.

8. The method of claim 1, wherein the identifier indicates a disruption resulting from hypertext language text and a programming object contained in the message.

9. A method for previewing a body of a message received over a network from a remote computer via a messaging system in a preview pane, the preview pane controlled by a message reader, the method comprising:

searching a nonvolatile storage location for a preview enable identifier indicative of proper shutdown;

setting the state of a preview enable value according to the presence of the preview enable identifier;

deleting the preview enable identifier from the nonvolatile storage location;

omitting to preview the body of a message received over a network from a remote computer via a messaging system in the preview pane according to the state of the preview enable value; and writing the preview enable identifier to the nonvolatile storage location upon proper shutdown of the message reader.

10. A method for automatically previewing a body of an electronic mail message in a preview pane, the preview pane controlled by an electronic mail program, the method comprising:

automatically selecting an electronic mail message for preview in the preview pane;

setting a preview enable value to a first state if a nonvolatile storage location contains a preview disable identifier;

setting the preview enable value to a second state if the nonvolatile storage location contains a preview enable identifier;

writing a preview disable identifier to the nonvolatile storage location;

performing the following steps if the preview enable value is the first state:

(a) displaying a warning dialog; and (b) omitting to preview the body of the selected message in the preview pane;

if the preview enable value is the second state, previewing the body of the selected message in the preview pane; and writing the preview enable identifier to the nonvolatile storage location upon proper shutdown of the message reader if the preview enable value is the second state.

11. A computer-readable medium having computer-executable instructions for performing the steps recited in claim 10.

12. A method for automatically previewing a body of an electronic mail message in a preview pane, the message relating to a message identifier, the preview pane controlled by an electronic mail program, the method comprising:

automatically selecting the electronic mail message for preview in the preview pane;

searching a nonvolatile storage location for the message identifier;

performing the following steps if the message identifier is found:

(a) displaying a warning dialog box comprising an option to not preview the selected electronic mail message; and (b) omitting to preview the body of the selected electronic mail message in the preview pane if the option is selected; and performing the following steps if the message identifier is not found:

(a) writing the message identifier to the nonvolatile storage location;

(b) previewing the selected electronic mail message in the preview pane; and (c) deleting the message identifier from the nonvolatile storage location if no system disruption occurs.

13. A computer-readable medium having computer-executable instructions for performing the steps recited in claim 12.

14. In a computer connected to a network comprising one or more remote computer, a message reader having a user interface for previewing a set of messages received over the network from the remote computers via a messaging system, wherein a message out of the set of messages received over the network from the remote computers via the messaging system comprises disruptive content and attempting previewing the message comprising disruptive content with the message reader leads to a disruption, the message reader comprising:

a nonvolatile storage location comprising an identifier indicative of whether or not a disruption related to previewing a message out of the set of messages received over the network from the remote computers via the messaging system occurred; and     a preview pane having functionality for automatically previewing a body of a message received from one of the remote computers over the network via the messaging system upon selection of the message received from one of the remote computers via the messaging system and responsive to the identifier indicative of whether or not a disruption relating to previewing occurred so as to inhibit the functionality for automatically previewing the message received from one of the remote computers via the messaging system according to whether or not the identifier indicative of whether or not a disruption relating to previewing occurred indicates a disruption related to previewing a message out of the set of messages received over the network from the remote computers via the messaging system occurred.

15. The message reader of claim 14 wherein the identifier is a message identifier relating to an electronic mail message, the message reader further comprising:

a folder comprising messages;

a folder contents pane for displaying header information relating to a message in the folder; and     an icon displaying logic operative for displaying an icon indicative of disruption, whereby the icon is displayed in the folder contents pane proximate to the header information relating to the message relating to the message identifier present in the nonvolatile storage location.

16. The message reader of claim 14 further comprising:

a preview enable setting indicative of message previewing, whereby the preview pane is enabled or disabled according to the preview enable setting.

17. The message reader of claim 16 further comprising:

a preview preference setting indicative of message previewing, whereby the preview pane is enabled or disabled according to the preview preference setting.

18. A computer-implemented method for controlling message previewing at a networked computer to avoid disruption related to previewing a most recently received message, wherein the most recently received message is received from a remote computer via a messaging system, the method comprising:

checking a nonvolatile storage location for an identifier indicative of whether or not a disruption occurred as a result of previewing the most recently received message; and     responsive to said checking, choosing between:

if the identifier indicates a disruption occurred, inhibiting previewing of the most recently received message, thereby avoiding disruption related to previewing the most recently received message; and     if the identifier indicates no disruption occurred, performing the following:

(a) writing an identifier indicative of a disruption to the nonvolatile storage location;

(b) previewing a body of the most recently received message in the preview pane; and         (c) writing an identifier indicative of no disruption to the nonvolatile storage location if no disruption occurs as a result of the previewing the body of the most recently received message.

19. A method of avoiding disruption caused by an electronic message received at a program operable to read electronic messages, wherein the electronic message comprises disruptive content, wherein the program for reading electronic messages provides functionality for automatically previewing the electronic message responsive to selection of the electronic message in a user interface of the program for reading electronic messages, the method comprising:

checking a nonvolatile storage location to determine whether a disruption to the electronic message program occurred as a result of said functionality for automatically previewing; and     responsive to affirmatively determining a disruption to the electronic message program occurred as a result of said functionality for automatically previewing, inhibiting said functionality for automatically previewing.

* * * * *

UNITED STATES PATENT AND TRADEMARK OFFICE
CERTIFICATE OF CORRECTION

PATENT NO.     : 6,134,566
DATED          : October 17, 2000
INVENTOR(S)    : Berman et al.

It is certified that error appears in the above-identified patent and that said Letters Patent is hereby corrected as shown below:

Column 12,
Line 23, "preview pane 15 178" should read -- preview pane 178 --.

Column 18,
Line 67, "computer," should read -- computers, --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*